United States Patent [19]

Kudo et al.

[11] 4,047,868

[45] Sept. 13, 1977

[54] MULTILAYER PARISON EXTRUSION MOLDING MACHINE FOR BLOW MOLDING

[75] Inventors: Kazuo Kudo; Takashi Mizutani, both of Tokyo, Japan

[73] Assignee: Toppan Printing Co., Ltd., Tokyo, Japan

[21] Appl. No.: 775,735

[22] Filed: Mar. 9, 1977

Related U.S. Application Data

[63] Continuation of Ser. No. 610,169, Sept. 4, 1975, abandoned.

[30] Foreign Application Priority Data

Aug. 12, 1975 Japan .................................. 50-97841

[51] Int. Cl.² .................................................. B29D 23/04
[52] U.S. Cl. .................................. 425/133.1; 264/173; 425/381; 425/462; 425/466; 425/532
[58] Field of Search ................ 425/133.1, 376, 380, 425/381, 466, 467, 462, DIG. 206; 264/DIG. 33, 241, 209, 173, 99; 72/258, 264; 264/99

[56] References Cited

U.S. PATENT DOCUMENTS

| | | | |
|---|---|---|---|
| 3,345,690 | 10/1967 | Hagen | 425/DIG. 206 |
| 3,419,938 | 1/1969 | Sonia et al. | 425/133.1 |
| 3,608,136 | 9/1971 | Tripptrap | 425/466 |
| 3,649,143 | 3/1972 | Papesh et al. | 425/133.1 X |
| 3,707,590 | 12/1972 | Wiggins et al. | 264/173 X |

Primary Examiner—Richard B. Lazarus
Assistant Examiner—Mark Rosenbaum
Attorney, Agent, or Firm—Lerner, David, Littenberg & Samuel

[57] ABSTRACT

A multilayer parison extrusion molding machine for blow molding which is characterized in that a main extruder and one or more sub-extruders are radially attached to special diehead and said die head comprises a core holder having a core pin at the lower end; a cylindrical mandrel enclosing said core holder; a plurality of sleeves surrounding said mandrel; housings surrounding said sleeves respectively; one or more pressure rings controlling the space in molten resin passages; pressure ring adjusting screws; an extrusion die; and a die adjusting screw.

3 Claims, 5 Drawing Figures o---- : PARISON THICKNESS NOT CONTROLLED
●—— : PARISON THICKNESS CONTROLLED

MULTILAYER PARISON EXTRUSION MOLDING MACHINE FOR BLOW MOLDING

This is a continuation of application Ser. No. 610,169, filed Sept. 4, 1975 now abandoned.

BACKGROUND OF THE INVENTION

This invention relates to an extrusion molding machine for producing multilayer parisons used for blow molding which consists of two or more kinds of thermoplastic synthetic resins. More particularly, the invention relates to an extrusion molding machine for producing multilayer parisons which consists of a plurality of thermally joined layers of synthetic resins, where, by using said multilayer parisons for blow molding operation, multilayer molded articles having desired characteristics of respective constituent materials can be produced.

Up to now, the blow molded articles have been widely used as the containers for foodstuffs, medicines, cosmetics, chemical materials, detergents and so forth, however, they have been generally single layer products. As the raw materials for the blow molded articles, thermoplastic resins such as polyethylene, polypropylene and polyvinyl chloride are commonly employed.

In recent years, the saving of oil and electric resources, the disposal of waste matter such as plastic articles, and the harmful effect of plastic in view of food sanitation especially in connection with polyvinyl chloride products have become social problems. Therefore the above containers or bottles must also be produced with minimum possible material and, at the same time, they must satisfy the requirements in use and have no problem in view of environmental pollution and food sanitation. Nevertheless the ordinary monolayer blow molding products are not able to satisfy all the above-mentioned requirements simultaneously.

Taking the laminated film wrappings into consideration, the inventors of the present application have carried out eager and extensive studies on the introduction of laminated structure to the blow molded articles, and thereby the present invention has been accomplished. That is, several properties of thermoplastic resins such as hardness, flexibility, tensile strength, gas permiability, chemical resistance and printability are different with the kinds of resins. While the outer surface of a bottle is liable to receive various external effects said influences and the appearance of the bottle is mainly influenced by the kind of material of the outer surface. Further, when the bottle is to be printed, the outer material may preferably have affinity to printing inks. On the other hand, the inside surface of the plastic bottle comes into direct contact with the material contained therein, so that the inside surface of the bottle must neither react with the contents nor release any extraneous substance into the contents. Still further, there is no such requirement with regard to the intermediate layer, therefore the materials for the intermediate layer may be those having the additional properties which are insufficient in the above-mentioned outer and inner layers, if any, or those improving the properties of the whole layers.

In view of the above, when the plastic bottles are made double layer structure or triple layer structure and most suitable materials are selected for the respective layers, more desirable bottles can be produced from smaller amount of resin materials as compared with the conventional single layer bottles.

BRIEF SUMMARY OF THE INVENTION

In accordance with the above consideration, the principal object of the present invention is to provide a novel extrusion molding machine for producing multilayer parisons used for the succeeding blow molding process.

Another object of the present invention is to provide a multilayer parison extrusion molding machine used for the production of uniform and quality blow molded products.

A further object of the present invention is to provide a multilayer parison extrusion molding machine which is simple in structure and reliable in working.

Still a further object of the present invention is to provide a novel extrusion diehead used for the above-mentioned extrusion molding machine.

The parison extrusion molding machine of the present invention is used by being installed in the preceding step of a blow molding process and said extrusion molding machine comprises a special diehead, a main extruder and one or more sub-extruders, the latter two kinds of extruders being attached to the former diehead in a radial relation. It is desirable that the angles of radial disposition between the main extruder and sub-extruders are within the range of 25° to 90°. When the angle is smaller than 25°, the attaching of extruders to the diehead becomes impossible because the extruder bodies interfere with each other, on the other hand, when the angle is larger than 90°, the floor space occupied by the whole apparatus becomes large. However, the extrusion molding machine of the present invention is not always restricted to the above-mentioned range.

Said diehead for the extrusion molding machine of the present invention comprises a core holder having a core pin at the lower end thereof, a cylindrical mandrel enclosing said core holder therein, a die portion comprising an extrusion die having an adjusting screw for adjusting the relative positions of said core pin and extrusion die, and also adapted to surround said core holder so as to form a molten resin extrusion outlet opening, and head portions provided on said die portion to form two or more layers.

Each of said head portions comprises a sleeve surrounding said mandrel, with the external surface of said sleeve being arranged to change the flow direction of the resin three times, while the internal surface of said sleeve being positioned to surround the mandrel with a suitable space therebetween. The head portion also includes a housing having the internal surface arranged parallel to the external surface of the sleeve to define a resin passage, and a pressure ring for controlling the thickness and pressure of the molten resin layer formed by said resin passage and also so shaped as to change the flowing direction of resin two times, and also includes a pressure ring adjusting screw attached to said pressure ring.

In addition, the resin passage of each head portion is arranged to merge at a junction so the individually-formed resin layers flow together at said junction to form a multilayer parison which is extruded from said resin extrusion outlet opening.

When double layer parisons are produced, a main extruder, a sub-extruder, two sleeves and two housings are used in the above-mentioned combination. When triple layer parisons are produced, two sub-extruders are attached to the diehead on both sides of a main extruder or a branching adapter is used between the diehead and the main extruder or the sub-extruder forming A/B/A triple layer parisons. When the extrusion of triple layer parison is carried out, three sleeves and three housings are fitted around the mandrel in a series arrangement to form the resin passage for triple layer extrusion.

BRIEF DESCRIPTION OF THE DRAWINGS

These and other objects and features of the present invention will become more apparent from the following description taken in connection with the accompanying drawings, in which.

DETAILED DESCRIPTION OF THE INVENTION

Figure 1:
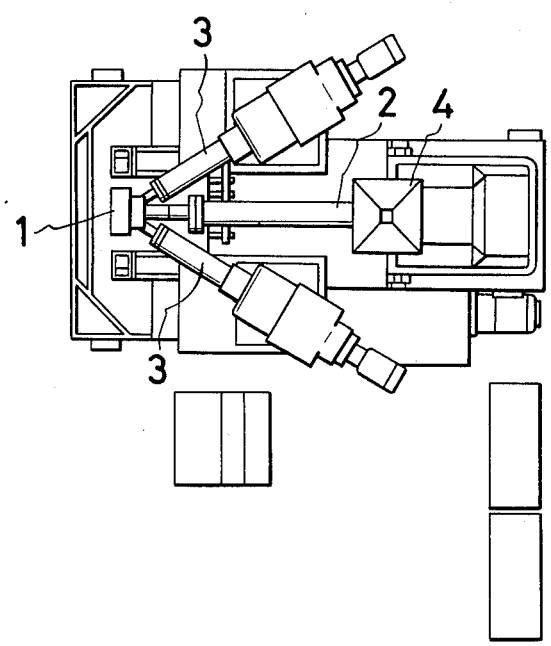
FIG. 1 is a schematic plan view of the multilayer parison extrusion molding machine for blow molding of the present invention.
Figure 2:
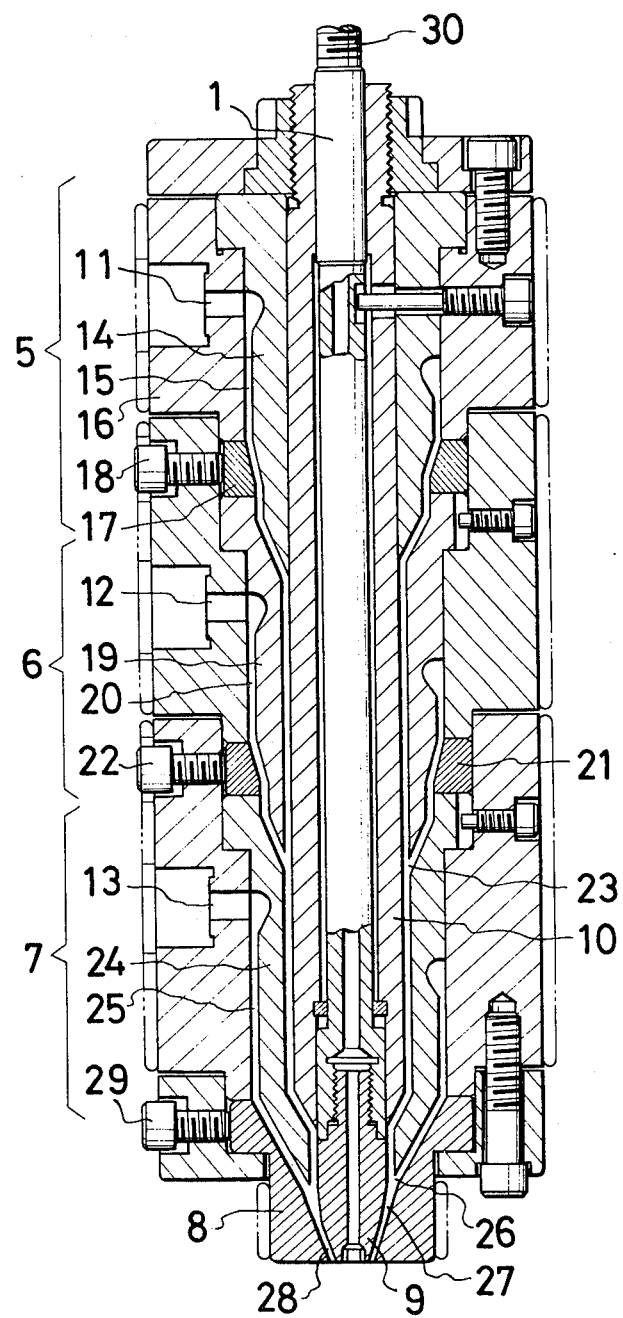
FIG. 2 is a vertical sectional view of an embodiment of diehead for triple layer parisons used for the above extrusion molding machine.

Referring now to the accompanying drawings, especially to FIGS. 1 and 2, the multilayer parison extrusion molding machine of the present invention will be further explained.

The parison extrusion molding machine of the invention comprises a special diehead 1, and a main extruder 2 and one or more sub-extruder 3 which are attached to said diehead 1 in a radial disposition. The extrusion molding machine shown in FIGS. 1 and 2 is used for extruding triple layer parisons and comprises a main extruder and two sub-extruders. When these triple layer parisons are used as the materials for blow molding, triple layer blow molded articles can be produced.

The novel point in the multilayer parison extrusion molding machine of the present invention resides in the special diehead 1 connected with a plurality of extruders 2 and 3, and the structures of the extruders themselves and succeeding blow molding machine are the same as those in the conventional art.

Two or three kinds of thermoplastic resin materials are fed into the extruders 2 and 3 through respective hoppers 4 (those for extruders 3 are omitted in FIG. 1), and the materials are fused and pressured by heating cylinders of the extruders. The molten materials are then fed into the diehead 1 from the extruders 2 and 3. The multilayer parison extruded from the diehead 1 of the present invention is subjected to blow molding by the succeeding blow molding machine according to the conventional method.

Therefore, the special diehead shown in FIG. 2 will be explained in the following.

The diehead 1 comprises an inner layer diehead portion 5 to form the innermost molten resin tube, an intermediate layer diehead portion 6 to form the intermediate molten resin tube, an outer layer diehead portion 7 to form the outer molten resin tube, and die portions 8. These portion 5, 6, 7 and 8 are aligned in the vertical direction around a mandrel 10 which encircles a core holder 30 having a core pin 9 at its lowmost end. Said portions 5, 6, 7 and 8 are provided with respective independent temperature controlling means and layer thickness controlling means. As seen from the drawings, this diehead 1 is the so-called cross-head type in which the extruders are connected to the diehead at right angles.

The resin material for each layer is fused and kneaded at an appropriate temperature by each extruder 2 or 3 and forced into each portion 5, 6 or 7 of the diehead 1.

The resin for the innermost layer is, for example, fed into the resin inlet 11 of the inner layer diehead portion 5 from the main extruder 2, divided by the sleeve 14 and, while flowing down through the resin passage 15, the divided ends are again caused to meet together to form a molten resin tube within the passage 15 which consists of the concentric wall portions of the sleeve 14 and the housing 16. The cross-sectional area of this resin passage 15 becomes gradually smaller according as the molten resin advances, therefore the pressure of the molten resin tube in the lower portion is larger than that in the upper portion, in addition, the stream of molten resin tube becomes a laminar flow. The thickness of this laminar flow of molten resin tube is then controlled by adjusting the space between the inner surface of the pressure ring 17 and the outer surface of the sleeve 14 by means of an adjusting screw 18, where the position of the pressure ring 17 is slightly changed in the horizontal direction. In connection with the adjustment of the thickness of the molten resin tube, it is desirable that a portion of the inside surface of the pressure ring 17 is made parallel to the direction of the resin flow.

The inner molten resin tube with controlled thickness then advances into the intermediate diehead portion 6. In this intermediate diehead portion 6, the molten resin for the intermediate layer is forced into the resin inlet 12 from a sub-extruder 3, and in like manner as the above diehead portion 5, an intermediate resin tube is formed in the resin passage 20 around the sleeve 19. After the thickness of the resin tube is controlled by another pressure ring 21 and an adjusting screw 22, the intermediate layer molten resin tube flows together on the outside of the above-mentioned inner layer molten resin tube at a junction 23. The two layer laminar flow of the molten resin advances through the resin passage formed between the mandrel 10 and a sleeve 24 for the below-mentioned outer layer resin, in which the resins of two layers do not get mixed maintaining the double layer structure.

While in the outer layer diehead portion 7, the molten resin for the outer layer is fed into the resin inlet 13 from another sub-extruder 3 and an outer layer molten resin tube is formed in a resin passage 25. This resin tube advances further and flows together with the above-mentioned two layer resin tube at the junction 26, thus a triple layer molten resin tube is formed and the layers are tightly joined together by heat and pressure in the resin passage 27 between the die 8 and the core pin 9. This triple layer molten resin tube is then extruded through the opening 28 formed on the front surface of the die 8, thus a triple layer parison is formed.

In the final extrusion step, the space between the die 8 and core pin 9 is adjusted by an adjusting screw 29, therefore there is no need to provide a pressure ring and an adjusting screw to the outer layer diehead portion 7.

Thus formed triple layer parison are then supplied to a conventionally known blow molding machine so as to produce triple layer blow molded articles.

Figure 3:
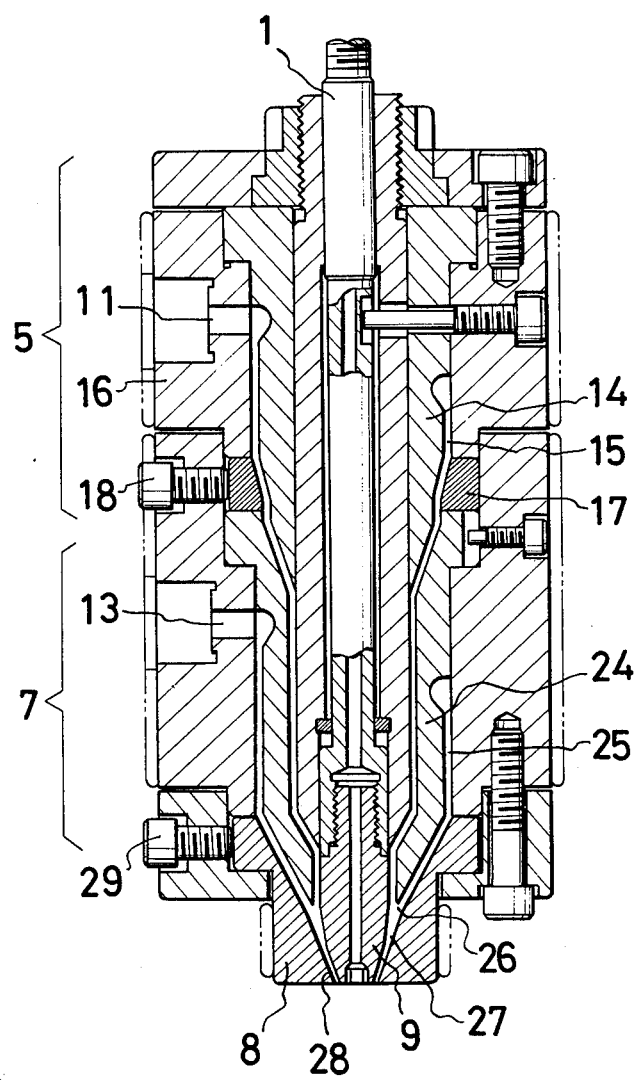
FIG. 3 is a vertical sectional view of another embodiment of diehead for double layer parisons.

When the parisons used for double layer blow molded articles are made, the above-mentioned intermediate layer diehead portion 6 is omitted and the end of resin passage 15 of the inner layer diehead portion 5 is connected to the resin passage formed by the inside wall of the sleeve 24 of the outer layer diehead portion 7, which will be accomplished by changing the configuration of the mandrel 10. The above-mentioned modification of the diehead 1 can be carried out by those skilled in the art in accordance with the present invention and other conventionally known art, however, for reference purposes, the structure of diehead for the double layer parison extrusion molding machine is illustrated in the accompanying FIG. 3, in which the reference numerals and functions of respective parts correspond to those of the diehead 1 in FIG. 2.

Further, both the triple layer parisons of three kind resins and those of two kind resins (layer structure: A/B/A) and be formed by changing the adapters connecting the diehead and the extruders of the parison extrusion molding machine of the present invention.

Furthermore, the thickness of parisons can be changed by varying the space between the core pin 9 and the die 8, which can be carried out by vertically moving the core holder 30 together with the core pin 9. Therefore, when the core holder 30 is controlled by an electric parison programer, the thickness of the parison can be precisely controlled and the turbulence of resin flow in the diehead can be decreased.

The present invention will be further explained in detail by way of examples in the following.

EXAMPLE 1

The 50 mm $\phi$ main extruder of a blow molding machine was connected to the inner layer diehead portion of a single double layer diehead of the present invention. A 30 mm $\phi$ sub-extruder was placed at right angle to the main extruder and connected to the outer layer diehead portion of the diehead. The main extruder was fed with maleic modified polypropylene (melt index: 1.5, density: 0.91) and the sub-extruder was fed with 6-nylon. The maximum temperature of the cylinder was set to 250° C and the temperature of the diehead was set to 240° C. Then 500 ml double layer bottles (outer layer: nylon/inner layer: polypropylene) were continuously formed. The obtained double layer bottles had the characteristics of the resin materials for each layer and it was confirmed that the moldability was stable and the rate of extrusion of each extruder was proportional to the thickness of each layer of the molded article. The characteristics of the molded double layer article (nylon: 22 wt%, total thickness: 600 $\mu$) were 0.39g/m$^2$·24hr·30$\mu$.atm in oxygen permeability, 9g/m$^2$·24hr·30$\mu$ in water vapor permeability, 35% in haze value (JIS K 6714), and 450g/15mm width · 90° peel in adhesion force between layers.

EXAMPLE 2

The main extruder of 80 mm $\phi$ of a blow molding machine was connected to the inner layer diehead portions of twin double layer dieheads of the present invention by using a branching adapter. Two outer layer diehead portions were connected to separate 30 mm $\phi$ sub-extruders which were disposed at 30° to said main extruder.

Figure 4:
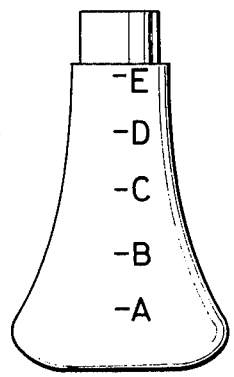
FIG. 4 is a side elevational of a blow molded bottle which has been produced from the parison made by using the parison extrusion molding machine of the present invention.

Further, an electronic parison programmer (20 points, made by Hunker Acrboratories Inc., U.S.A.) was attached to the core holder of the diehead in order to control the thickness of parisons, and the double layer bottles as shown in FIG. 4 were produced. The sizes of each bottle were about 12 cm in height and 8 cm in maximum diameter and the variation of blowing ratios along the bottle body was relatively large. In the operation, colored maleic modified polypropylene was fed in the main extruder and 6-nylon was fed in the two sub-extruders. The molding was carried out at the same temperatures as those in Example 1 and the turbulence of laminar flow in the diehead owing to the parison control was not observed.

Figure 5:
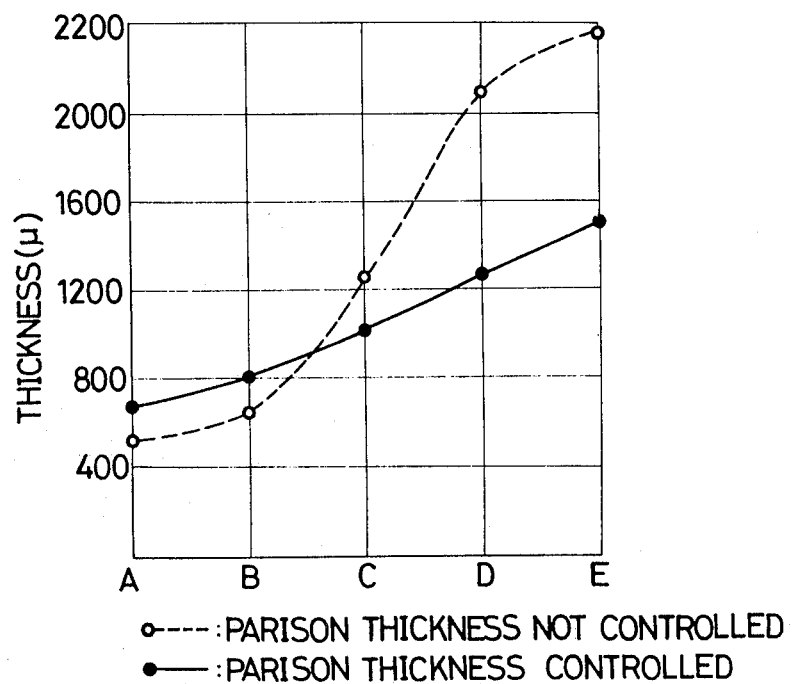
FIG. 5 is a graph showing the results of measurement of the wall thicknesses of blow molded articles.

Thus excellent bottles (outer layer: nylon/ inner layer: colored polypropylene) with controlled thickness were produced. These bottles were compared with similar bottles produced without thickness control. The results of comparison in thicknesses at the points A–E in FIG. 4 are shown in FIG. 5.

EXAMPLE 3

The 60 mm $\phi$ main extruder of a blow molding machine was connected to twin double layer dieheads of the present invention in like manner as the foregoing Example 2 by using an adapter and two of 25 mm $\phi$ sub-extruders were connected to the dieheads in like manner as Example 2. The main extruder was fed with maleic modified low density polyethylene (melt index: 2, density: 0.920) and the maximum temperature of the cylinder was set to 190° C. While, the sub-extruders were fed with 6,6-nylon and the maximum temperature of the cylinders was set to 220° C to obtain 30 mm $\phi$ tubular containers. The molded products with thickness of 600 $\mu$(nylon 15%) had even thickness and the adhesion force between layers of 500g/15 mm width · 90° peel, and the quality was excellent.

EXAMPLE 4

The twin double layer dieheads used in Example 3 were disassembled and other diehead portions were inserted between the pairs of inner and outer diehead portions with using mandrels for triple layer structure, thereby twin triple layer dieheads were formed. By using an adapter to divide the molten resin into four equal parts, 60 mm $\phi$ main extruder was connected to four points of the inner and outer layer diehead portions of the twin dieheads. Further in like manner as Example 2, separate 25 mm $\phi$ sub-extruders were connected to respective intermediate layer diehead portions. The main extruder was fed with maleic modified low density polyethylene (LDPE) and the maximum temperature of the cylinder was set to 190° C. While two sub-extruders were fed with saponification product of ethylene-vinyl acetate co-polymer (EPVA) (ethylene content: 30 molar %, saponification value: 99.5%) and the maximum temperature of the cylinders were set to 240° C. Further, the temperature of diehead was set to 230° C and flexible triple layer containers (LDPE/EPVA/LDPE) were molded with stable condition. The obtained containers had wall thickness of 600 $\mu$ (EPVA 70–90 $\mu$) and well protected the contents. The characteristics of the molded products were 0.04g/m$^2$·24hr·30$\mu$.atm in oxygen permeability, 8g/m$^2$·24hr·30$\mu$ in water vapor permeability and 400g/15 mm width·90° peel in adhesion force between layers.

EXAMPLE 5

The twin triple layer dieheads used in Example 4 were employed, where a 25 mm $\phi$ sub-extruder was connected to two inner layer diehead portions with using a branching adapter, a 60 mm $\phi$ main extruder was connected to two intermediate layer diehead portions, and another 25 mm φ sub-extruder was connected to two outer layer diehead portions. Two sub-extruders were fed with high density polyethylene (melt index: 0.3, density: 0.945) and the maximum temperature of cylinders were set to 200° C. While the main extruder was fed with polyethylene high-filter resin containing 50% of clay and the maximum temperature of the cylinder was set to 180° C. Further the diehead temperature was set to 190° C and 200 ml flat containers were molded. As the result, stable products were obtained. With regard to the molded product, the high-filler resin was coated with polyethylene layers on both sides, therefore the defects of the high-filler resin such as poor surface property, appearance, pinch-off strength, and releasing of components were very much improved. The total thickness of the wall portion of container was 800 μ and the thicknesses of the outer and inner polyethylene layers were both 60 μ.

In accordance with the above disclosure and examples, the excellence and usefulness of the present invention will be understood. It should be emphasized, however, that the specific embodiments described and shown herein are intended as merely illustrative and in no way restrictive of the invention.

We claim:

1. A multilayer parison extrusion molding machine for blow molding wherein one main extruder and one or more subextruders are mounted radially around one diehead at an angle of 25° to 90° relative to each other, said diehead comprises a core holder having a core pin at the lowermost end thereof, a cylindrical mandrel enclosing said core holder therein, a die portion including an extrusion die and adjusting means for adjusting the relative positions of said core pin and said extrusion die, said die portion constructed to surround said core holder so as to form a resin extrusion outlet opening, and at least two head portions provided on said die portion, each of said head portions form a resin layer and wherein each of said portions comprises:
   a. a sleeve surrounding said mandrel, the external surface of said sleeve being arranged to allow change of the flowing direction of resin and the internal surface thereof being arranged to surround the mandrel;
   b. a housing which surrounds said sleeve with a space therebetween to define a resin passage for forming a resin layer, and includes an internal surface parallel to the external surface of said sleeve, and a resin inlet opening connected to said resin passage and to one of said extruders;
   c. a pressure ring mounted on said housing downstream from said resin inlet opening for controlling the thickness and pressure of the molten resin layer formed by said resin passage, at least one surface of said pressure ring being arranged parallel to the external surface of said sleeve and shaped to change the flow direction of the resin layer, another surface of said pressure ring being arranged parallel to the external surface of said mandrel and spaced from the external surface of said sleeve, the pressure ring surface directions in cooperation with the internal surface of the housing being adapted to change the resin flowing direction two times; and
   d. means operatively associated with said pressure ring for adjusting said pressure ring to vary the size of said resin passage; and the resin passages of adjacent ones of said head portions arranged to merge at a respective junction so that the individual resin layers formed in each of said head portions flow together at the respective junction and subsequent downstream junctions so as to form a multilayer parison which is extruded from said resin extrusion outlet opening.

2. A multilayer parison extrusion molding machine for blow molding as claimed in claim 1 wherein two sleeves, two housings, one pressure ring, and one pressure ring adjusting means are assembled to said diehead to extrude a double layer parison.

3. A multilayer parison extrusion molding machine for blow molding as claimed in claim 1 wherein three sleeves, three housings, two pressure rings, and two pressure ring adjusting means are assembled to said diehead to extrude a triple layer parison.

* * * * *